US011645624B2

(12) United States Patent
Ganti et al.

(10) Patent No.: US 11,645,624 B2
(45) Date of Patent: May 9, 2023

(54) PERSONALIZED VISUAL PRESENTATION OF JOB SKILLS

(71) Applicant: Eightfold AI Inc., Mountain View, CA (US)

(72) Inventors: Pooja Shamili Ganti, Telangana (IN); Kushal Satya, Uttar Pradesh (IN); Divye Pallav, Delhi (IN)

(73) Assignee: Eightfold AI Inc., Mountain View, CA (US)

( * ) Notice: Subject to any disclaimer, the term of this patent is extended or adjusted under 35 U.S.C. 154(b) by 0 days.

(21) Appl. No.: 17/113,783

(22) Filed: Dec. 7, 2020

(65) Prior Publication Data
US 2022/0180321 A1 Jun. 9, 2022

(51) Int. Cl.
G06Q 10/00 (2023.01)
G06Q 10/105 (2023.01)
G06Q 10/0639 (2023.01)
G06Q 30/0201 (2023.01)
G06F 16/9538 (2019.01)
G06F 16/9535 (2019.01)
G06N 3/08 (2023.01)
G06Q 50/20 (2012.01)
G06Q 10/10 (2023.01)

(52) U.S. Cl.
CPC ....... *G06Q 10/105* (2013.01); *G06F 16/9535* (2019.01); *G06F 16/9538* (2019.01); *G06Q 10/06398* (2013.01); *G06Q 30/0201* (2013.01); *G06N 3/08* (2013.01); *G06Q 10/103* (2013.01); *G06Q 50/2057* (2013.01)

(58) Field of Classification Search
None
See application file for complete search history.

(56) References Cited

U.S. PATENT DOCUMENTS 11,126,949 B1* 9/2021 Shook ................ G06Q 50/2057
2012/0197993 A1* 8/2012 Skomoroch ............ G06F 16/35
709/204

(Continued)

OTHER PUBLICATIONS

Bhattacharjee, Rahul, Recruiting AI and ML Talent is not just an #EndGame, Jun. 1, 2019, LinkedIn, https://www.linkedin.com/pulse/recruiting-ai-talent-just-endgame-rahul-bhattacharjee?articleId=6540673677539799040, p. 1-6. (Year: 2019).*

*Primary Examiner* — Joseph M Waesco
(74) *Attorney, Agent, or Firm* — Zhong Law, LLC

(57) ABSTRACT

A system and method for providing personalized presentation of job skills in one or more organizations. The system includes an interface device and a processing device to retrieve, based on one or more identifiers, a set of talent profiles stored in a human resource (HR) information system, calculate, based on the one or more skills in each of the set of talent profiles, an inventory of skills, for each skill in the inventor of skills, calculate a trend value based on timestamps and one or more skills associated with the set of talent profiles, responsive to identifying a first job profile, generate a first skill cloud, the first skill cloud comprising symbols representing skills contained in the inventory of skills arranged in an order determined based on the trend value associated with each skill in the inventory of skills, and present, in a graphical user interface implemented on the interface device, the first skill cloud.

14 Claims, 6 Drawing Sheets

(56) References Cited

U.S. PATENT DOCUMENTS

| | | | |
|---|---|---|---|
| 2014/0081928 A1* | 3/2014 | Skomoroch | G06F 16/355 707/692 |
| 2014/0379602 A1* | 12/2014 | Nelson | G06Q 10/00 705/327 |
| 2016/0378882 A1* | 12/2016 | Rodriguez | H04L 67/306 707/737 |
| 2017/0061550 A1* | 3/2017 | Lin | G06Q 50/01 |
| 2017/0069009 A1* | 3/2017 | Bursey | G06F 16/29 |
| 2019/0087783 A1* | 3/2019 | Wang | G06F 16/951 |
| 2019/0188742 A1* | 6/2019 | Vasudevan | G06Q 30/0202 |
| 2019/0197180 A1* | 6/2019 | Jersin | H04L 51/02 |
| 2019/0197487 A1* | 6/2019 | Jersin | G06F 16/635 |
| 2020/0311684 A1* | 10/2020 | Ma | G06Q 10/1053 |
| 2021/0177261 A1* | 6/2021 | Geethanath | A61B 5/0042 |
| 2021/0209558 A1* | 7/2021 | Barulli | G06N 7/005 |
| 2021/0263945 A1* | 8/2021 | Siebel | H04L 67/60 |

* cited by examiner

PERSONALIZED VISUAL PRESENTATION OF JOB SKILLS

TECHNICAL FIELD

The present disclosure relates to technical solutions that help a user quickly understand and visually compare different aspects of a job description, and in particular to a system, method, and storage medium including executable computer programs for providing personalized visual presentation of job skills in the context of an organization composed of employees.

BACKGROUND

An organization may be associated with many people. The organization can be a company, a nonprofit organization, an academic institute, or a government agency. The people associated with the organization can be employees of the organization, students of the organization, or candidates applying for a position of the organization. The organization may provide the people associated with the organization with access to a personal career site (PCS). The PCS may include listings of jobs that these people could review and apply for.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
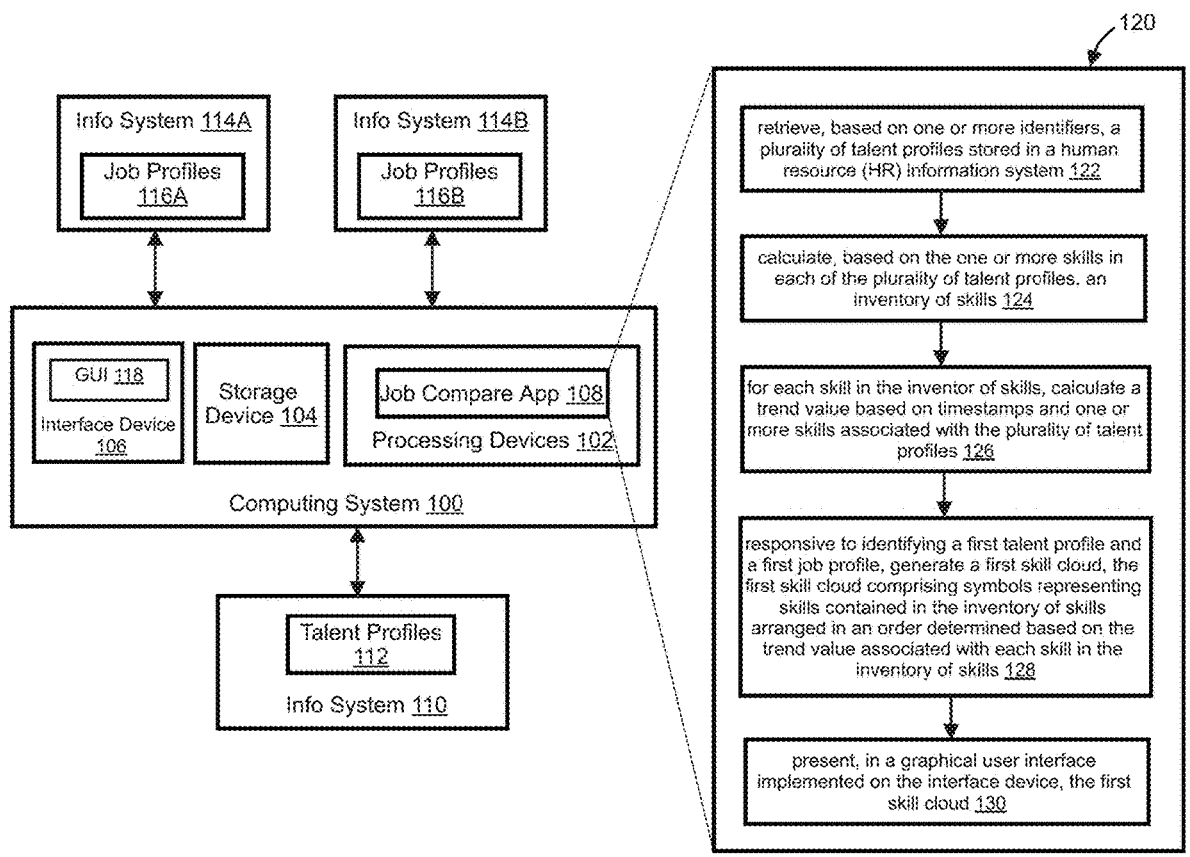
FIG. 1 illustrates a computing system implementing a personalized job compare application for providing personalized presentation of job skills in an organization according to an implementation of the disclosure.

The personal career site (PCS) may be presented in the form of a web site that includes web pages for people (referred to as users). Currently, the users (e.g., employees of a company or students of an academic institute) of the PCS may access the web pages to review job postings. In current implementations, the users may access one job listing at a time, where the job listing is presented sequentially in a predetermined order. For example, the job listing may be presented in the order of "job title," "location," "job description," "skills requested," "work experience," "education requirements," and "other requirements." All these aspects of the job listing may be specified in one or more paragraphs of text of a certain language (e.g., English, French, German, Chinese).

The users may use the PCS for job search or career planning. In job search, a user may browse through job listings, and for career planning, the user may wish to understand how the user's background and skills compared to other including those at similar positions and at target positions. Current PCS may provide two corresponding workflows for job search and career planning Under both workflows, the user may view a job insight section that lists the skills requested by the job. In some implementations, the PCS may provide side-by-side listings of job insights. For example, the user may enter a query searching for a "Senior Software Development Lead." The query may generate a response including the job insights at three different companies that list the skills requested by these companies for the same job title. In addition to job search and career planning, other applications may also require skill assessments. For example, in an education and training application, different courses may require assessment of pre-requisite skills. In a project management application, the project may require assessment of the skills of team members.

However, there are certain deficiencies for the current approach to presenting job listings. First, this current approach to presenting job listings does not present the different requirements by different companies in an intuitive fashion to the user because the skill requirements for different companies are presented independently without relevant comparison. Second, the current approach to presenting job listings present only the skills requested in the job listings, thus presenting these skills without the context of the hiring company. The user cannot derive the skills as a whole possessed by the employees of the hiring organization and the popularity of different skills within the hiring company. Third, the current approach to present job listings are not personalized to the user. In particular, the current approach does not compare the skills requested by a job and the skill set possessed by the user. Thus, there is no visual indication of whether the user is qualified for the job or not. Fourth, the approach to presenting job listings lacks certain information such as seniority level and salary data cross companies and seniority levels. Thus, there is a need for technical solutions to address the practical problems of presenting job listings to an end user on PCS.

Implementations of the disclosure provide technical solutions that may present personalized job listings that include visual presentations of the requested job skills in the context of the skill inventory of the organization. For the job search workflow, implementations of the disclosure may provide intuitive visual presentations of comparison between similar roles within an organization, comparison between similar roles across different organizations, and comparison between different roles across different organizations. These visual presentation may allow the user to easily understand the differences between different job listings with respect to the user in the context of the organization. For the career planning workflow, implementations may provide intuitive visual presentations of comparison of similar career paths and comparison of different career paths.

Implementations of the disclosure may include a computing system for providing personalized presentation of job skills in an organization. The computing system may include an interface device and a processing device, communicatively connected to the interface device, to retrieve, based on one or more identifiers, a plurality of talent profiles stored in a human resource (HR) information system, wherein each of the plurality of talent profiles comprises one or more skills, and wherein each of the plurality of talent profiles is associated with a corresponding timestamp, calculate, based on the one or more skills in each of the plurality of talent profiles, an inventory of skills, for each skill in the inventor of skills, calculate a trend value based on timestamps and one or more skills associated with the plurality of talent profiles, responsive to identifying a first job profile, generate a first skill cloud, the first skill cloud comprising symbols representing skills contained in the inventory of skills arranged in an order determined based on the trend value associated with each skill in the inventory of skills, and present, in a graphical user interface implemented on the interface device, the first skill cloud.

FIG. 1 illustrates a computing system 100 implementing a personalized job compare application 108 for providing personalized presentation of job skills in an organization according to an implementation of the disclosure. Job compare application 108 in this disclosure can be an enterprise software application supporting a career website or a component of a job exchange platform that may be used by different organizations to post jobs and accessed by a wide range of users. Computing system 100 can be a standalone computer or a networked computing resource implemented in a computing cloud. Referring to FIG. 1, computing system 100 may include one or more processing devices 102, a storage device 104, and an interface device 106, where the storage device 104 and the interface device 106 are communicatively coupled to processing devices 102.

Processing device 102 can be a hardware processor such as a central processing unit (CPU), a graphic processing unit (GPU), or an accelerator circuit. Interface device 106 can be a display such as a touch screen of a desktop, laptop, or smart phone. Storage device 104 can be a memory device, a hard disc, or a cloud storage connected to processing device 102 through a network interface card (not shown).

Processing device 102 can be a programmable device that may be programmed to implement a graphical user interface 118 presented on interface device 106. Graphical user interface ("GUI") 118 allows a user to view graphic representations presented on interface device 106, and allows using an input device (e.g., a keyboard, a mouse, and/or a touch screen) to interact with graphic representations (e.g., icons) presented on GUI 118. In one implementation, GUI 118 may include graphic representations representing job listings or job insights personalized to the user in the context of the hiring organization. GUI 118 may also include graphic representations representing job listings or job insights relating to multiple jobs that are within the organization or across different organizations. The graphic representations are presented in a fashion that places the user's skill set in the context of the organization's skill inventory, thus helping the user understand the user's qualification for the job and user's skill set as compared to the skill inventory of the organization.

Computing system 100 may be connected to other information systems 110, 114A, 114B through network (not shown). These information systems can be one or more human resource management (HRM) systems that are associated with same or different organizations. The HRM systems can track external/internal candidate information in the pre-hiring phase (e.g., using an applicant track system (ATS)), or track employee information after they are hired (e.g., using an HR information system (HRIS)). Thus, these information systems may include databases that contain information relating to candidates and current employees.

In one implementation, information system 110 may include a database that stores talent profiles 112 associated with one or more organizations. A talent profile can be a data object that contain data points related to an employee including current and previous employees. The collection of talent profiles 112 stored in information system 110 may represent the information describing all employees that are working for and have worked for the organization. In some implementations, the talent profile 112 may include a job title held by the employee, the technical or non-technical skills possessed by the employee for performing the job held by the employee, and the location (e.g., city and state) of the employee. Example of technical skills may include programming languages and knowledge of software platforms; examples of non-technical skills may include administrative skills such as implementing a certain regulatory policy. The talent profile 112 may further include the employee's education background information including schools he or she has attended, fields of study, and degrees obtained. The talent profile 112 may further include other professional information of the employee such as professional certifications the employee has obtained, achievement awards, professional publications, and technical contributions to public forum (e.g., open source code contributions). In addition to these fact-based data points, the talent profile may also be enriched to include derived information relating to the employee. For example, talent profile 112 may include predicted values that indicate the likely career path through the organization if the employee stays with the organization for a certain period of time. The career path may indicate the potential of the employee with the organization.

Computing system 100 may be connected to information systems 114A, 114B that may each belong to a hiring organization that may be in the market to hire employees. Each information system 114A, 114B may include job profiles 116A, 116B that specify different aspects of the job openings. In one implementation, a job profile may include specifications about the job such as job titles, job functions, prior experiences, a list of job skills requested for performing the job, requisite education/degrees/certificates/licenses etc. The job profiles may also include desired personality traits of the candidates such as leadership attributes, social attributes, and altitudes. Additionally, these job profiles are stored in a database and are searchable by using a query such as the job title.

In one implementation, processing devices 102 may execute a job compare application 108 that may generalize personalized job listings in the context of the inventory of skills within one or more hiring organizations and present the personalized job listings in the form of skill clouds in GUI 118. The skill cloud is a graph composed of symbols (e.g., words) representing skills arranged in a certain order. Job compare application 108 can be a standalone application executed by processing devices. A user (e.g., an employee of a company or a student of an education institute) may use job compare application 108 to retrieve job profiles, and generate and present personalized job listings in GUI 118.

Job compare application 108, when executed by processing devices 102 at the command of a user to perform operations. At 122, processing devices 102 may retrieve, based on selected one or more identifiers, a set of talent profiles from talent profiles 112 stored in information system 110. The one or more identifiers can be selected job identifiers can be one or more words that may be used to identify a job profile. In one implementation, for example, the selected job identifiers can be a job title, a job skill, or a number of years of working experience. Job compare application 108 may present a GUI element in GUI 118, prompting the user to enter the one or more job identifiers in the GUI element (e.g., a form). Responsive to receiving user-entered one or more job identifiers as a query, job compare application 108 may search information system 110 to identify the set of talent profiles that match the one or more job identifiers. The one or more identifiers can also be a course identifier or a project identifier to which a set of talent profiles may be associated with.

In one implementation, job compare application 108 may include a seniority normalization component that may identify similar level of jobs across different organizations. For a similar job (e.g., similar pay scale, similar job functions), different organizations may have different job titles. Thus, instead of strictly searching for talent profiles having the same job titles, job compare application may execute the seniority normalization component to identify talent profiles having a similar seniority either having a same job title or a different job title. In one implementation, the seniority normalization component may include a neural network module that may receive different job titles as input, and group these job titles into different groups, where each group may contain a similar seniority level of job title across different organizations. The neural network module may have been trained using known data points of employees of different organizations. The data points may include salaries, job functions, working experience etc.

Each of the identified talent profiles may be associated with a corresponding employee of an organization. A talent profile, as discussed above, may include one or more skills possessed by the employee associated with the talent profile. Further, each of the identified talent profiles (or any one in talent profiles 112) may be associated with a timestamp which is a sequence of alphanumeric characters that encodes the time at which the talent profile was created in information system 110. For example, the timestamp may indicate the day, month, and year in which the talent profile was last updated or stored in information system 110.

In addition to the skills possessed by the corresponding employee, each talent profile may be associated with one or more predicted skills. The predicted skills are skills that the employee is likely to learn within a specified time period (e.g., 2 years). In one implementation, a neural network module may be employed to derive insights about the corresponding employee. The insight may include next skills, next roles, and next companies. The neural network module may be trained using the employment histories of current employees or previous employees in this organization or other organizations. In one implementation, the neural network module may include a recurrent neural network (RNN) module that is trained by adjusting the parameters of the RNN module based on the employment histories. By applying the trained RNN module to an employee, the RNN module may generate predicted skills of the employee. These predicted skills may be combined with the already possessed skills to for the one or more skills associated with the talent profile of the employee.

At 124, processing devices 102 may further calculate, based on the one or more skills associated with each of the identified of talent profiles, an inventory of skills. The inventory of skills is a catalogue of all skills that have appeared at least once in the set of talent profiles retrieved based on the one or more job identifiers. The inventory of skills can be calculated by performing a union operation on skills in the set of talent profiles retrieved based on the one or more job identifiers. The inventory of skills may provide a context of skills existing in the organization with which each job listing may be compared.

For each skill in the inventory of skills, at 126, processing devices 102 may calculate a trend value based on timestamps associated with the set of identified talent profiles and the skills in the set of talent profiles. The trend value for a particular skill may represent a change of count of the skill over a period of time (e.g., 10 years). The count of skill may be the number of talent profiles including the skill. For example, processing devices 102 may determine the count of the skill at consecutive time points (e.g., years or months) based on the talent profiles having the skill and their timestamps. Further, processing devices 102 may calculate the trend value at each time point as the difference value between the count of the skill at the current time point and the count of skill at a previous time point. A positive value of the trend value may indicate that the skill becomes more popular among the employees; a negative value of the trend value may indicate that the skill becomes less popular among the employees. In another implementation, the trend value may be an average of the difference values for all time points over a period of time (e.g., over 10 years for the difference values at each year).

Processing devices 102 may further identify a user and retrieve a talent profile associated with the user from information system 110. The talent profile associated with the user may have been created by the user in advance. For example, the user may create a resume and store the resume as the talent profile in information system 110. The talent profile may include the skills possessed by the user. Processing devices 102 may further identify a job (e.g., selected by the user through GUI 118). Responsive to identifying the user's talent profile and the selected job, at 128, processing devices 102 may further generate a first skill cloud comprising symbols representing skills contained in the inventory of skills arranged in an order determined based on the trend value associated with each skill in the inventory of skills.

In one implementation, the symbols may represent the inventory of skills. The first skill cloud may arrange the symbols representing the skills in the inventory of skills in an order according to the trend values. For example, symbols may be arranged in an order from high to low trend values. These symbols covering the full inventory of skills may provide a context to a job and a user's talent profile. The skill represented by each symbol may or may not be required by a particular job or possessed by the user. Thus, in one implementation, with respect to the particular job, each symbol in a skill cloud may further include a first indicator indicating whether the skill represented by the symbol is required by the particular job. In one implementation, the first indicator can be a shading pattern on the graphic representation of the symbol. For example, a shaded symbol may indicate that the skill presented by the symbol is required by the particular job; an unshaded symbol may indicate that the skill is not required.

With respect to a user, the symbol may include a second indicator (e.g., a check sign) indicating whether the skill represented by the symbol is possessed by the user or included in the talent profile of the user. In one implementation, the second indicator can be the presence of a check sign in the symbol signaling that the user possesses the skill in the skill cloud.

At 130, processing devices 102 may present, GUI 118, the first skill cloud to the user. The graphical representation of the skill cloud may provide a personalized visualization of the required skills for the job in the context of the inventor of skills.

Figure 2:
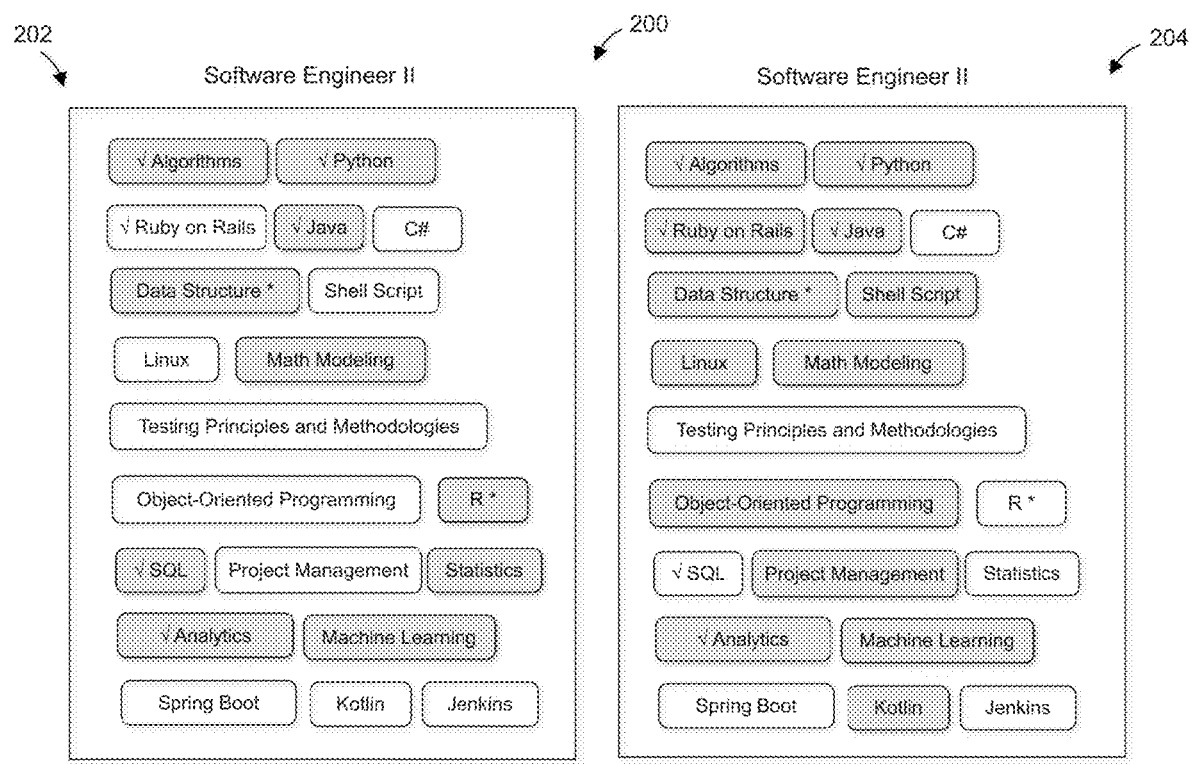
FIG. 2 illustrates a side-by-side comparison of two skill clouds according to an implementation of the disclosure.

Thus, each skill cloud may encode the job skills required by a job listing personalized to the user in the context of the inventory of skills. This visual presentation of skill cloud is particularly useful when comparing more than one job listings side by side. FIG. 2 illustrates a side-by-side comparison 200 of two skill clouds 202, 204 according to an implementation of the disclosure. Referring to FIG. 2, processing devices 102 may generate a first skill cloud 202 for a first job listing personalized to a user and a second skill cloud 204 for a second job listing personalized to the same user. Here, the first job listing and the second job listing can be posted by a same company or different companies. The user may select the first job listing and the second job listing to determine which job is a better match to the user's skill set.

As shown in FIG. 2, the job listings may have been identified based on a job title ("Software Engineer II"). Based on the job title, job compare application 108 may retrieve a set of job listings and present the set of job listings (e.g., hyperlinks of the job listings) on GUI 118 for the user to choose. The user may choose two job listings (e.g., by clicking the corresponding hyperlinks) from the set of job listings to compare these two jobs with respect to the user's qualifications (e.g., the possessed skill set). Each of the two job listings may include visual presentations in the form of skill clouds 202, 204 relating to skills requirements in the context of the inventory of skills derived from the set of job listings.

Each of skill clouds 202, 204 may include an ordered list of symbols (e.g., algorithms, Python, Ruby on Rails . . . ) representing the skills in the inventory of skills. These skills in the skill clouds 202, 204 are arranged in an order according to the corresponding trend value associated with each skill. For example, the skills in skill clouds 202, 204 may include all skills in the inventory of skills in an order form high to low trend values. Thus, as the examples presented in FIG. 2, the trend value associated with "Algorithm" is higher than that for "Python," and the trend value associated with "Python" is higher than that for "Ruby on Rails" etc.

The ordered list of skills in the inventory may provide a context for the skills required by the job listings. For the first job listing of a "Software Engineer II" presented in skill cloud 202, the first job listing may require a first subset of skills (e.g., "Algorithm," "Python," "Java," "Data Structure," "Math Modeling," "R," "SQL," "Statistics," "Analytics," and "Machine Learning." The job compare application may provide a first indicator (e.g., shading the box surrounding the symbol) to indicate that these skills are required by the first job listing in the context of the inventory of skills. Further, based the user in the user's talent profile, the job compare application may optionally provide a second indicator (e.g., a check mark) indicating the skills possessed by the user. The example of skill cloud 202 includes the second indicator to show that the user possesses the skills of "Algorithm," "Python," "Ruby on Rails," "Java," "SQL," and "Analytics." Further, the job compare application may optionally provide a third indicator to indicate whether a particular skill in currently popular among the set of talent profiles retrieved based on the job title. In one implementation, the popularity may be determined based on whether the number of talent profiles including the skill is above a threshold value (e.g., more than 60% of talent profiles).

To make an intuitive and meaningful comparison between two or more jobs, the job listings can be presented side by side in a graphical user interface. As shown in FIG. 2, skill cloud 204 may represent a second job listing. Skill cloud 204 may include symbols of all of the skills in the inventory of skills also listed in the order according to the trend values as skill cloud 202. Similarly, the skills required by the second job listing of "Software Engineer II" may include the first indicators (e.g., the shaded surrounding boxes) indicating the skills required by the second job listing. These required skills may include certain skills (e.g., "Algorithm," "Python," "Java," "Data Structure," "Math Modeling," "Analytics," and "Machine Learning") similarly required by the first job listing and certain skills that are different from the skills (e.g., "Ruby on Rails," "Shell Script," "Linux," "Object-Oriented Programming," "Project Management," "Kotlin") required by the first job listing. Further, skill cloud 204 may also include the second indicator to indicate the skills possessed by the user and/or a third indicator to indicate the popularity of a skill. In this way, the user can easily compare the first and second job listings in a common context (i.e., the ordered inventory of skills) personalized to the user's talent profile. The user does not need to make extra efforts to compare his/her skills with the different skill requirements by different job listings. Thus, implementations of the disclosure provide technical solution that may reduce the time for the user to make a comparison between two or more job listings.

Figure 3:
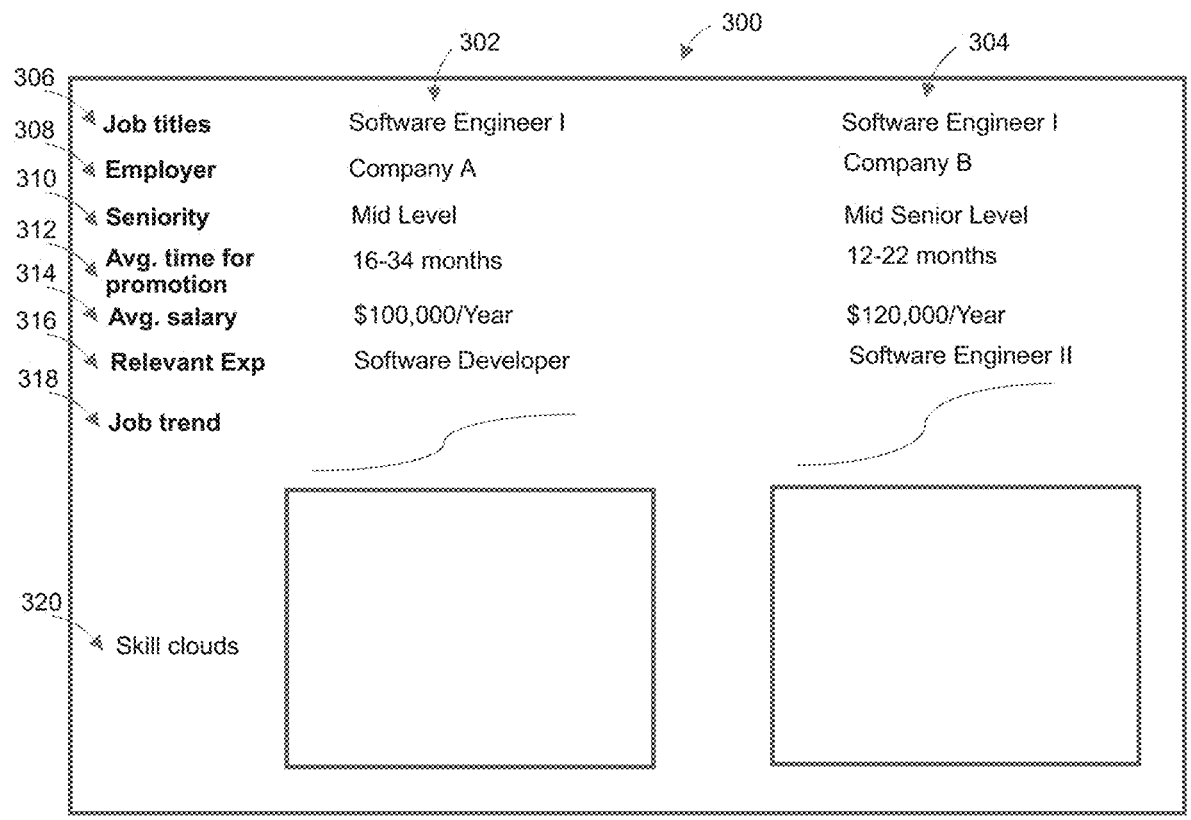
FIG. 3 illustrates a personal career site according to an implementation of the disclosure.

In addition to the skill clouds, the job compare application may provide the comparison of other features relating to the job listings such as employer organization, seniority level, average time for next promotion, average salary, relevant experience, job trend in a personal career site. FIG. 3 illustrates a personal career site 300 according to an implementation of the disclosure. As shown in FIG. 3, personal career site 300 may include a first job listing 302 and a second job listing 304. Each of the job listings 302, 304 may include values for a list of features including, for example, job titles 306, employer organization 308, seniority level 310, average time to next promotion 312, average salary 314, relevant experience (or related job experience) 316, job trend 318 (i.e., the number of people in this role in the employer organization), and skill cloud 320. All these aspects may constitute a full picture of the comparison between job listing 302 and job listing 304. Personal career site 300 may also show other information such as the number of applicants for each job listing to indicate the popularity of the job listing, and a ranking for potential promotion in the future (e.g., a list of future job titles with expected times for promotion). To further increase the convenience for a user, the personal career site 300 may provide a filter that may selectively display skills based on certain criteria. For example, the filter may be activated to selectively provide the set of skills that are needed for a job or the set of skills possessed by a user or the set of skills that are trending in a direction (e.g., upwards or downwards).

Figure 4:
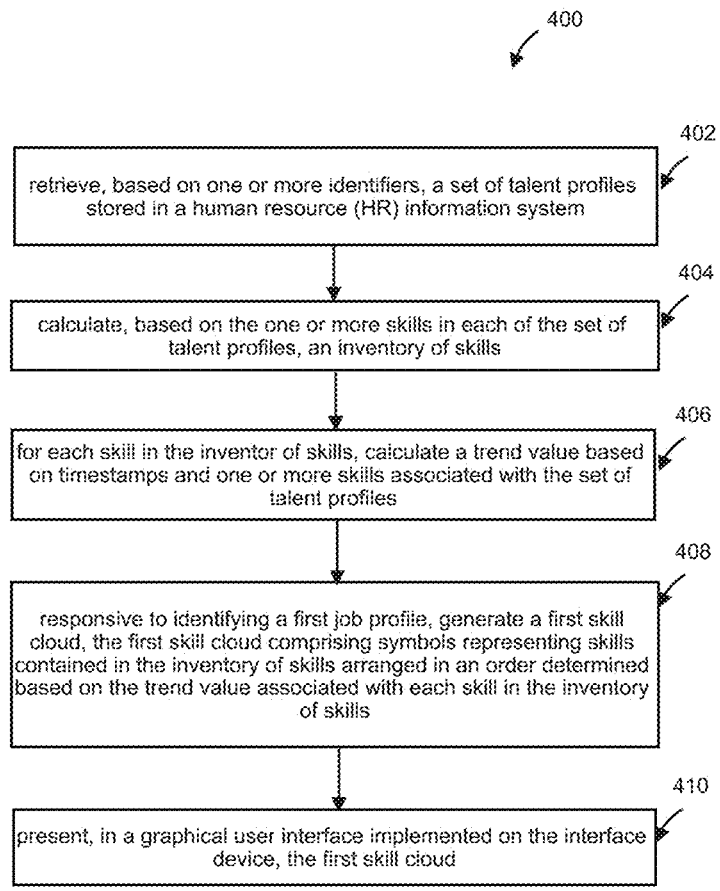
FIG. 4 illustrates a flowchart of a method for providing personalized presentation of job skills in one or more organizations according to an implementation of the disclosure.

FIG. 4 illustrates a flowchart of a method 400 for providing personalized presentation of job skills in one or more organizations according to an implementation of the disclosure. Method 400 may be performed by processing devices that may comprise hardware (e.g., circuitry, dedicated logic), computer readable instructions (e.g., run on a general purpose computer system or a dedicated machine), or a combination of both. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a processing device 102 executing job compare application 108 as shown in FIG. 1.

As shown in FIG. 4, processing devices 102 may, at 402, retrieve, based on selected one or more identifiers, a set of talent profiles stored in a human resource (HR) information system, where each of the set of talent profiles comprises one or more skills, and each of the set of talent profiles is associated with a corresponding timestamp.

At 404, processing devices 102 may calculate, based on the one or more skills in each of the set of talent profiles, an inventory of skills.

At 406, processing devices 102 may for each skill in the inventor of skills, calculate a trend value based on timestamps and one or more skills associated with the set of talent profiles.

Responsive to identifying a first job profile, at 408, processing devices 102 may generate a first skill cloud, the first skill cloud including symbols representing skills contained in the inventory of skills arranged in an order determined based on the trend value associated with each skill in the inventory of skills, where each symbol comprises a first indicator indicating whether the skill represented by the symbol is requested by the first job profile.

At 408, processing devices 102 may present, in a graphical user interface implemented on the interface device, the first skill cloud.

Although examples are discussed in light of the skills and skill cloud, implementations of the disclosure can be similarly expanded to other aspects of the job listing such as, for example, non-technical skills and job-related certifications. Clouds for these aspects can be constructed in a manner similar to the skill cloud.

Figure 5:
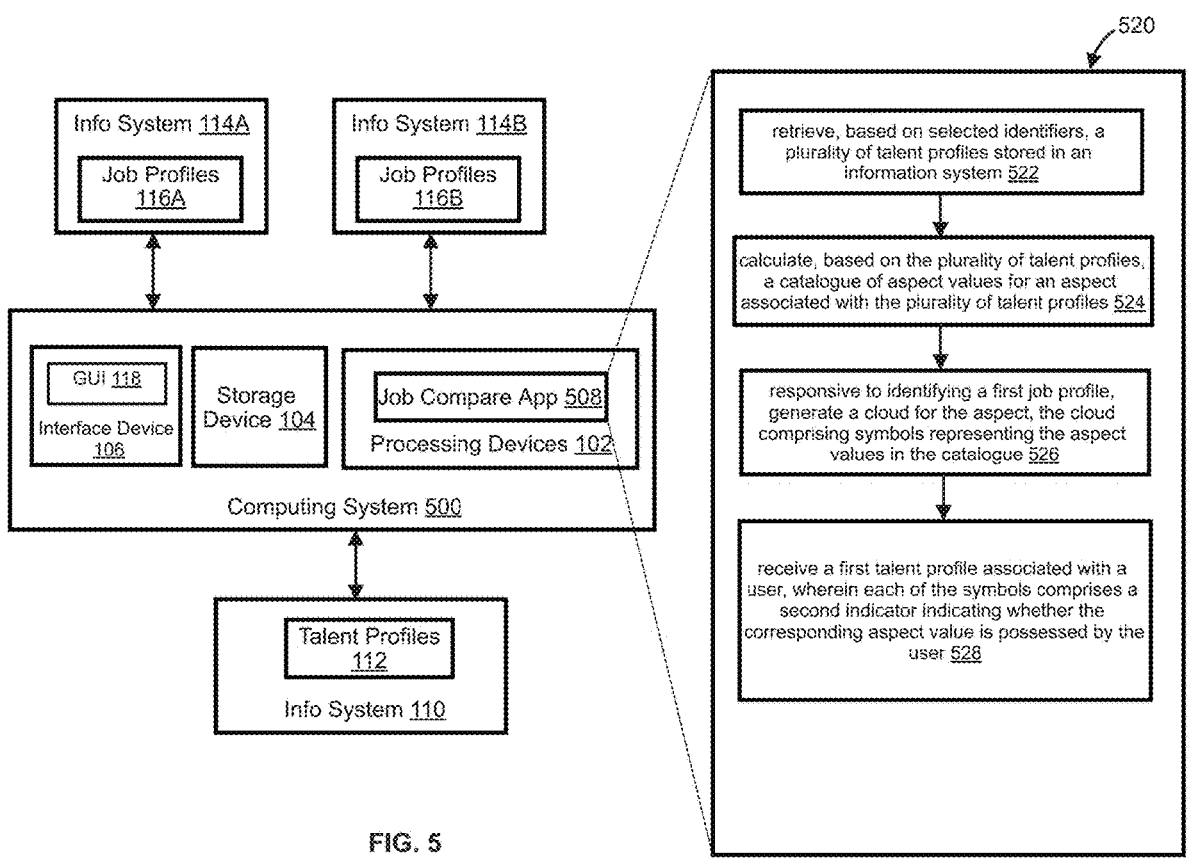
FIG. 5 illustrates a computing system implementing a job compare application for providing aspects of job skills according to an implementation of the disclosure

FIG. 5 illustrates a computing system 500 implementing a job compare application 508 for providing aspects of job skills according to an implementation of the disclosure. Computing system 500 may include components similar to computing system 100 as shown in FIG. 1. Processing devices 102 may execute job compare application 508 to perform operations 520.

At 522, processing devices 102 may retrieve, based on selected identifiers, a plurality of talent profiles stored in an information system.

At 524, processing devices 102 may calculate, based on the plurality of talent profiles, a catalogue of aspect values for an aspect associated with the plurality of talent profiles.

At 526, responsive to identifying a first job profile, processing devices 102 may generate a cloud for the aspect, the cloud comprising symbols representing the aspect values in the catalogue, where each of the symbols comprises a first indicator indicating whether the corresponding aspect value is requested by the first job profile.

At 528, processing devices may receive a first talent profile associated with a user, where each of the symbols comprises a second indicator indicating whether the corresponding aspect value is possessed by the user.

Figure 6:
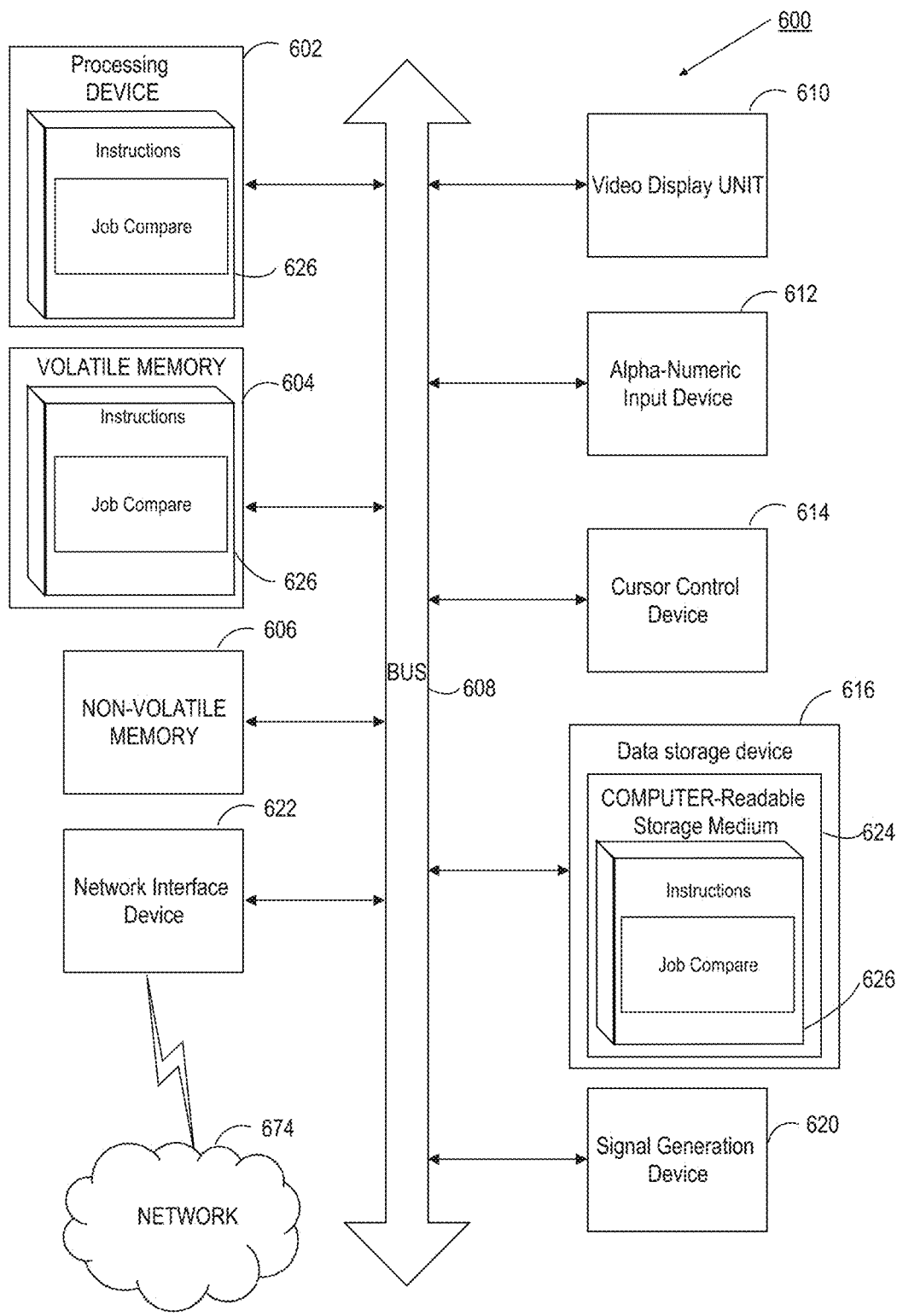
FIG. 6 depicts a block diagram of a computer system operating in accordance with one or more aspects of the present disclosure.

FIG. 6 depicts a block diagram of a computer system operating in accordance with one or more aspects of the present disclosure. In various illustrative examples, computer system 600 may correspond to the processing device 102 of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions of the job compare application 108 of FIG. 1 for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A computing system for providing personalized presentation of job skills in one or more organizations, the computing system comprising:
    an interface device; and
    a processing device, communicatively connected to the interface device, to:
        retrieve, based on one or more identifiers, a plurality of talent profiles stored in a human resource (HR) information system, calculate, using a neural network module, predicted skills associated with each of the plurality of talent profiles, and combine the predicted skills with possessed skills in each of the plurality of talent profiles to form one or more skills associated with each of the plurality of talent profiles, wherein parameters of the neural network module are trained iteratively based on historical employee talent profiles, and the iterative training of the neural network module includes receiving previous employee talent profiles at a first time point, calculating one or more predicted skills using the neural network module, and adjusting the parameters of the neural network module based on a comparison of the calculated one or more predicted skills with skills of the previous employee talent profiles at a second time point, and wherein each of the plurality of talent profiles is associated with a corresponding timestamp;
        calculate, based on the one or more skills in each of the plurality of talent profiles, an inventory of skills;
        for each skill in the inventory of skills, calculate a trend value based on timestamps and one or more skills associated with the plurality of talent profiles;
        responsive to identifying a first job profile, generate a first skill cloud, the first skill cloud comprising symbols representing skills contained in the inventory of skills arranged in an order determined based on the trend value associated with each skill in the inventory of skills, wherein the inventory of skills are arranged in one of a descending order or an ascending order of the trend value, and wherein each symbol comprises a first indicator indicating whether the skill represented by the symbol is requested by the first job profile;
        responsive to identifying a second job, generate a second skill cloud, the second skill cloud comprising the same symbols as the first skill cloud arranged in the same order; and
        present, in a graphical user interface implemented on the interface device, the first skill cloud and the second skill cloud to present a personalized comparison between the first job and the second job with respect to qualification of the user.

2. The computing system of claim 1, wherein the one or more identifiers comprise job titles that are determined to be similar among the one or more organizations, and wherein each of the plurality of talent profiles is associated with an employee that holds at least one of the job titles.

3. The computing system of claim 2, wherein the timestamp associated with each of the plurality of talent profiles indicates a time point at which the corresponding talent profile is created.

4. The computing system of claim 3, wherein the one or more skills include at least one of possessed skills or next skills, wherein for each skill in the inventory of skills, the trend value represents a change in a count of the skill over a period of time, and wherein a high trend value indicates a more frequently present skill among the plurality of talent profiles.

5. The computing system of claim 1, wherein the processing device is further to identify a first talent profile, wherein the first talent profile is associated with a user of the HR information system and comprises skills possessed by the user, and the first job profile comprises skills requested for a candidate of a first job.

6. The computing system of claim 5, wherein each of the symbols representing a corresponding skill comprises a second indicator indicates whether the user possesses the skill.

7. The computing system of claim 6, wherein each of the symbols representing a corresponding skill further comprises a third indicator indicating a popularity of the skill.

8. A method for providing personalized presentation of job skills in one or more organizations, the method comprising:

retrieving, by a processing device based on one or more identifiers, a plurality of talent profiles stored in a human resource (HR) information system, calculating, using a neural network module, predicted skills associated with each of the plurality of talent profiles, and combining the predicted skills with possessed skills in each of the plurality of talent profiles to form one or more skills associated with each of the plurality of talent profiles, wherein parameters of the neural network module are trained iteratively based on historical employee talent profiles, and the iterative training of the neural network module includes receiving previous employee talent profiles at a first time point, calculating one or more predicted skills using the neural network module, and adjusting the parameters of the neural network module based on a comparison of the calculated one or more predicted skills with skills of the previous employee talent profiles at a second time point, and wherein each of the plurality of talent profiles is associated with a corresponding timestamp;

calculating, based on the one or more skills in each of the plurality of talent profiles, an inventory of skills;

for each skill in the inventory of skills, calculating a trend value based on timestamps and one or more skills associated with the plurality of talent profiles;

responsive to identifying a first job profile, generating a first skill cloud, the first skill cloud comprising symbols representing skills contained in the inventory of skills arranged in an order determined based on the trend value associated with each skill in the inventory of skills, wherein the inventory of skills are arranged in one of a descending order or an ascending order of the trend value, and wherein each symbol comprises a first indicator indicating whether the skill represented by the symbol is requested by the first job profile;

responsive to identifying a second job, generating a second skill cloud, the second skill cloud comprising the same symbols as the first skill cloud arranged in the same order; and presenting, in a graphical user interface implemented on an interface device, the first skill cloud and the second skill cloud to present a personalized comparison between the first job and the second job with respect to qualification of the user.

9. The method of claim 8, wherein the one or more identifiers comprise job titles that are determined to be similar among the one or more organizations, and wherein each of the plurality of talent profiles is associated with an employee that holds at least one of the job titles.

10. The method of claim 9, wherein the timestamp associated with each of the plurality of talent profiles indicates a time point at which the corresponding talent profile is created.

11. The method of claim 10, wherein the one or more skills include at least one of possessed skills or next skills, wherein for each skill in the inventory of skills, the trend value represents a change in a count of the skill over a period of time, and wherein a high trend value indicates a more frequently present skill among the plurality of talent profiles.

12. The method of claim 8, further comprising identifying a first talent profile, wherein the first talent profile is associated with a user of the HR information system and comprises skills possessed by the user, and the first job profile comprises skills requested for a candidate of a first job.

13. The method of claim 12, wherein each of the symbols representing a corresponding skill comprises a second indicator indicates whether the user possesses the skill.

14. The method of claim 13, wherein each of the symbols representing a corresponding skill further comprises a third indicator indicating a popularity of the skill.

* * * * *